US006233451B1

(12) United States Patent
Noerpel et al.

(10) Patent No.: US 6,233,451 B1
(45) Date of Patent: May 15, 2001

(54) SPOT BEAM SELECTION IN A MOBILE SATELLITE COMMUNICATION SYSTEM

(75) Inventors: Anthony Noerpel, Lovettsville, VA (US); Chandra Joshi, Gaithersburg, MD (US); Michael Parr, Hermosa Beach, CA (US); Zhengping Gao, Gaithersburg; Stephanie Demers, Rockville, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/115,096

(22) Filed: Jul. 13, 1998

Related U.S. Application Data

(60) Provisional application No. 60/052,443, filed on Jul. 14, 1997.

(51) Int. Cl.$^7$ .................................................. H04Q 7/20
(52) U.S. Cl. ......................... 455/427; 455/428; 455/429
(58) Field of Search .................................... 455/427, 429, 455/430, 428, 507, 517

(56) References Cited

U.S. PATENT DOCUMENTS

| | | | |
|---|---|---|---|
| 4,599,619 | * | 7/1986 | Keigler et al. ...................... 343/352 |
| 5,602,833 | * | 2/1997 | Zehavi ................................ 370/209 |
| 5,659,545 | * | 8/1997 | Sowles et al. ...................... 370/324 |
| 5,689,568 | * | 11/1997 | Laborde ................................ 380/49 |
| 5,736,959 | * | 4/1998 | Patterson et al. .................... 342/354 |
| 5,752,187 | * | 5/1998 | Frank et al. ......................... 455/428 |
| 5,907,809 | * | 5/1999 | Molnar et al. ....................... 455/456 |
| 5,952,962 | * | 9/1999 | Dybdal ................................ 342/359 |
| 6,157,621 | * | 12/2000 | Brown et al. ........................ 370/310 |

* cited by examiner

Primary Examiner—Daniel Hunter
Assistant Examiner—Charles Chow
(74) Attorney, Agent, or Firm—John T. Whelan; Michael W. Sales

(57) ABSTRACT

An access terminal for initiating spot beam selection in a satellite communication system, in which the access terminal includes a receiver for measuring the received signal strength (RSS) of a multiplicity of radio frequency communication spot beam links. The access terminal is further provided with a microcontroller for comparing the received signal strengths from each of the multiplicity of spot beams to initiate information communication via a communication channel of the satellite communication system. In a described embodiment, the controller of the access terminal compares seven spot beam links to determine whether to initiate information communication with one of the seven spot beams received. Additionally, a memory coupled to the controller of the access terminal is used for storing spot beam identification information including the spot beam links assigned to the access terminal via the satellite communication system. The selection procedure employed by the system and method described facilitate a rapid selection of an appropriate spot beam identified from the multiplicity of radio frequency spot beam links received at a mobile access terminal.

20 Claims, 8 Drawing Sheets

SIX-TIMESLOT CHANNEL
BCH/CCCH CONTROL CHANNEL ORGANIZATION

COVERAGE PARTITIONING INTO REGIONS
TO SPREAD THE SATELLITE POWER

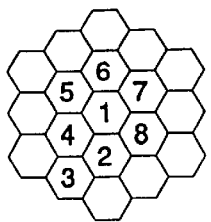

| Frame | | | | |
|---|---|---|---|---|
| 0 | FCCH-1 | GBCH-\|1,2,5,6\| | BCCH-7 | GBCH-\|3,4,7,8\| |
| 1 | FCCH-2 | GBCH-\|1,2,5,6\| | BCCH-8 | GBCH-\|3,4,7,8\| |
| 2 | BCCH-1 | GBCH-\|1,2,5,6\| | FCCH-3 | GBCH-\|3,4,7,8\| |
| 3 | BCCH-2 | GBCH-\|1,2,5,6\| | FCCH-4 | GBCH-\|3,4,7,8\| |
| | FCCH-5 | GBCH-\|1,2,5,6\| | BCCH-3 | GBCH-\|3,4,7,8\| |
| | FCCH-6 | GBCH-\|1,2,5,6\| | BCCH-4 | GBCH-\|3,4,7,8\| |
| | BCCH-5 | GBCH-\|1,2,5,6\| | FCCH-7 | GBCH-\|3,4,7,8\| |
| | BCCH-6 | GBCH-\|1,2,5,6\| | FCCH-8 | GBCH-\|3,4,7,8\| 31 |
| | FCCH-1 | GBCH-\|1,2,5,6\| | BCCH-7 | GBCH-\|3,4,7,8\| |
| | FCCH-2 | GBCH-\|1,2,5,6\| | BCCH-8 | GBCH-\|3,4,7,8\| |
| | BCCH-1 | GBCH-\|1,2,5,6\| | FCCH-3 | GBCH-\|3,4,7,8\| |
| | BCCH-2 | GBCH-\|1,2,5,6\| | FCCH-4 | GBCH-\|3,4,7,8\| |
| | FCCH-5 | GBCH-\|1,2,5,6\| | BCCH-3 | GBCH-\|3,4,7,8\| |
| | FCCH-6 | GBCH-\|1,2,5,6\| | BCCH-4 | GBCH-\|3,4,7,8\| |
| | BCCH-5 | GBCH-\|1,2,5,6\| | FCCH-7 | GBCH-\|3,4,7,8\| |
| 15 | BCCH-6 | GBCH-\|1,2,5,6\| | FCCH-8 | GBCH-\|3,4,7,8\| |

23 0     6     12     18     23 0

TIME SLOT ⟶

FCCHs AND BCCHs FOR ALL SEVEN BEAMS IN A MULTIFRAME

*FIG. 4*

TWO CONSECUTIVE REGIONS ARE DELAYED BY ONE TIME SLOT

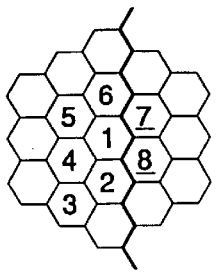

| Frame | | | | | |
|---|---|---|---|---|---|
| 0 | FCCH-1 | | GBCH-1,2,5,6 | | BCCH-7 | GBCH-3,4,GBCH-7,8 |
| 1 | FCCH-2 | | GBCH-1,2,5,6 | | BCCH-8 | GBCH-3,4,GBCH-7,8 |
| 2 | BCCH-1 | | GBCH-1,2,5,6 | FCCH-3 | | GBCH-3,4,GBCH-7,8 |
| 3 | BCCH-2 | | GBCH-1,2,5,6 | FCCH-4 | | GBCH-3,4,GBCH-7,8 |
| | FCCH-5 | | GBCH-1,2,5,6 | | BCCH-3 | GBCH-3,4,GBCH-7,8 |
| | FCCH-6 | | GBCH-1,2,5,6 | | BCCH-4 | GBCH-3,4,GBCH-7,8 |
| | BCCH-5 | | GBCH-1,2,5,6 | FCCH-7 | | GBCH-3,4,GBCH-7,8 |
| | BCCH-6 | | GBCH-1,2,5,6 | FCCH-8 | | GBCH-3,4,GBCH-7,8 |
| | FCCH-1 | | GBCH-1,2,5,6 | | BCCH-7 | GBCH-3,4,GBCH-7,8 |
| | FCCH-2 | | GBCH-1,2,5,6 | | BCCH-8 | GBCH-3,4,GBCH-7,8 |
| | BCCH-1 | | GBCH-1,2,5,6 | FCCH-3 | | GBCH-3,4,GBCH-7,8 |
| | BCCH-2 | | GBCH-1,2,5,6 | FCCH-4 | | GBCH-3,4,GBCH-7,8 |
| | FCCH-5 | | GBCH-1,2,5,6 | | BCCH-3 | GBCH-3,4,GBCH-7,8 |
| | FCCH-6 | | GBCH-1,2,5,6 | | BCCH-4 | GBCH-3,4,GBCH-7,8 |
| | BCCH-5 | | GBCH-1,2,5,6 | FCCH-7 | | GBCH-3,4,GBCH-7,8 |
| 15 | BCCH-6 | | GBCH-1,2,5,6 | FCCH-8 | | GBCH-3,4,GBCH-7,8 |

FRAME NUMBER 23 0      6      12      18      23 0

TIME SLOT ⟶

FHHCs AND BCCH POSITIONS WITHIN A MULTIFRAME BETWEEN TWO REGIONS

*FIG. 7*

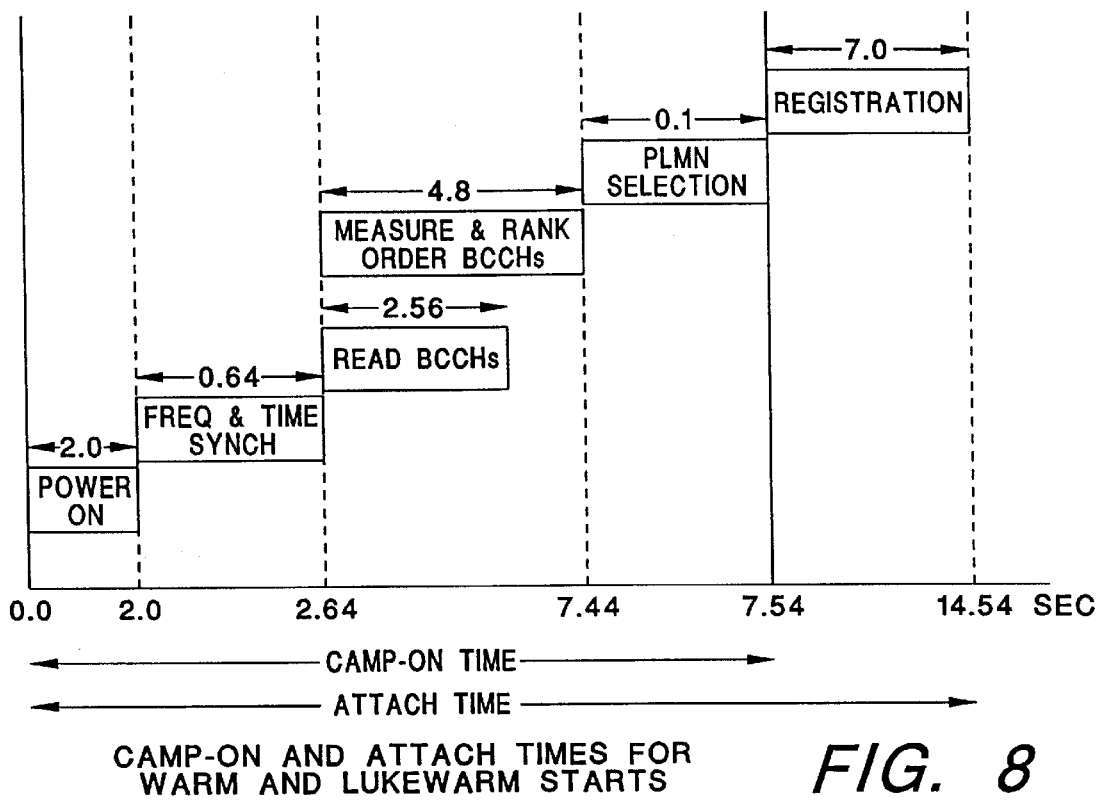
FIG. 8 CAMP-ON AND ATTACH TIMES FOR WARM AND LUKEWARM STARTS
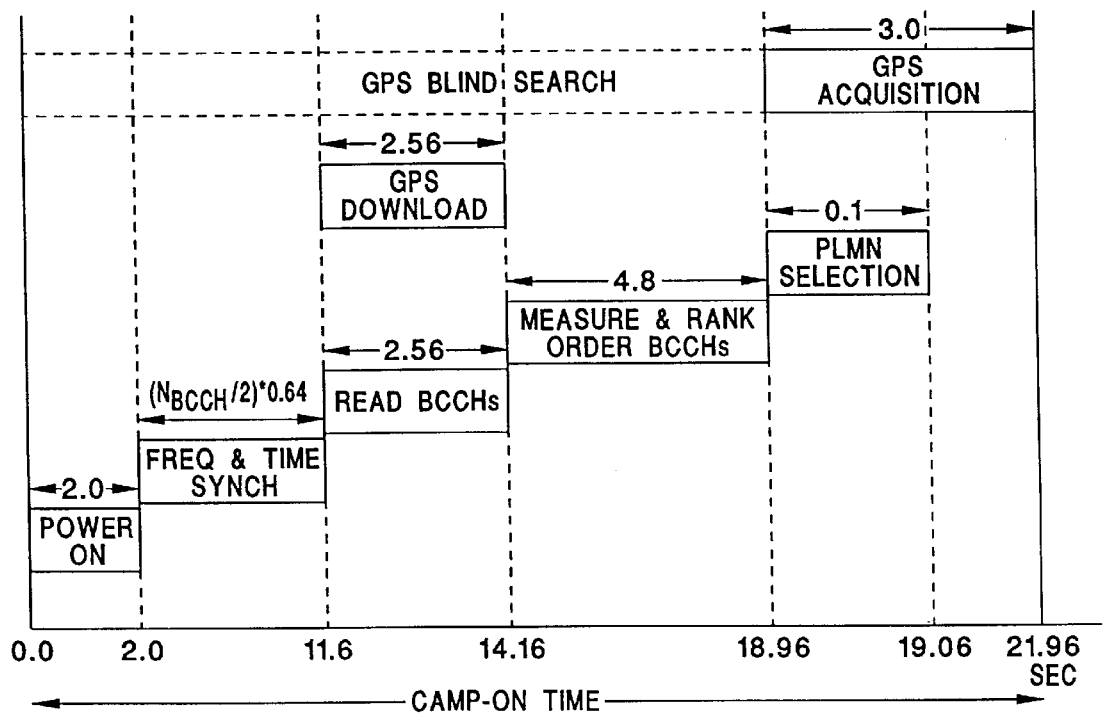
FIG. 9 CAMP-ON TIME FOR COLD START WHEN $N_{BCCH}=30$

SPOT BEAM SELECTION IN A MOBILE SATELLITE COMMUNICATION SYSTEM

This application claims benefit of Provisional Appln 60/052,443 filed Jul. 14, 1997.

BACKGROUND OF THE INVENTION

The present invention relates to cellular and satellite communications. More particularly, the invention relates to a method and a system for ensuring that a user terminal, when operating in a GEM system nearly always selects the best spot beam to access the system which maximizes the power-limited capacity of the system to handle phone calls for ongoing voice communications between a mobile transmitter and a satellite in a time division multiple access (TDMA) system.

The spot beam selection and reselection procedure is the first of four (4) processes performed in the idle mode. These four (4) processes are spot beam selection and reselection, Public Land Mobile Network (PLMN) selection, global positioning system (GPS) position determination, and location updating, in accordance with the invention.

A mobile satellite communication system such as the Geosynchronous Earth Orbit Mobile (GEM) network discussed herein, typically includes one or more satellites, at least one fixed ground terminal such as a gateway system (GS) and several mobile access terminals (ATs). The access terminals typically communicate with the public switched telephone network (PSTN) or other mobile terminals via an air communication interface between the satellite and the gateway. Using the mobile access terminals, the satellite system provides a variety of telephony services. Satellite telephony systems as described herein share call processing information with terrestrial systems such as the GSM cellular system to allow compatibility between the satellite, cellular, and the public switch telephone network services. The terrestrial standards such as GSM may not apply directly to the mobile satellite communication system, more particularly the satellite air interface poses physical constraints not accounted for in the GSM architecture.

A number of communication systems utilizing satellites and small mobile terminals provide voice and other information communication. In all such systems, the satellite power associated with the communication links may be an expensive resource, e.g., constrained by satellite solar power. In addition, the mobile access terminals, such as hand-held terminals (HHTs), are often moved from one spot beam to another spot beam as users travel. Thus, to establish and maintain an optimal communication channel, an appropriate spot beam selection procedure must be employed for a user terminal in a GEM satellite system.

If too many mobiles select the wrong spot beam or a spot beam with lower RSS, then the system capacity will suffer. This is because the satellite capacity to serve telephone calls is constrained by available transmit power which is limited by the solar panels, batteries, and output power limitation of the transmit amplifiers.

If 50% of all user terminals select the spot beam with the weaker signal and that signal is 2 dB less than the strongest signal, then the capacity of the satellite to handle phone calls based on power limitations is reduced by 23%.

Thus, there exists a need for a method and a system for fast and efficient spot beam selection in a GEO Mobile Satellite System to provide acceptable performance with a minimum amount of power being used by the satellite and access terminal systems.

A satellite system is different from a cellular system in that all signals originate from the same point source, i.e., the satellite for all spot beams. In addition, all spot beam signals take the same propagation path from the satellite to the handset and therefore the measurement that the handset makes on the signals are highly correlated. Furthermore, the signals can be synchronized to a master timing reference source or oscillator in the satellite. These differences with the cellular system provide the opportunity to organize and control channels in the different spot beams to be time orthogonal.

SUMMARY OF THE INVENTION

Accordingly, the present invention addresses selecting the best spot beam based on relative received power or using the received signal strength indicator (RSSI) or any other signal strength measurements in a Geosynchronous Earth Orbit Mobile Satellite System, i.e., a Geo Mobile (GEM) system, which is critical to the performance of the entire satellite system. The invention thus provides a method and a system of organizing the control channel signals being broadcast by the satellite in its spot beams to enable rapid determination of the best spot beam by the user access terminal.

Briefly summarized, the present invention relates a system for employing an access terminal for initiating spot beam selection in a satellite communication system, in which the access terminal includes a receiver for measuring the received signal strength (RSS) of a multiplicity of radio frequency communication spot beam links. The access terminal is further provided with a controller for comparing the received signal strengths from each of the multiplicity of spot beams to initiate information communication via a communication channel of the satellite communication system. In a described embodiment, the controller of the access terminal may compare six or more spot beam links at the same time to determine whether to initiate information communication with one of the several spot beams received. Additionally,.a memory coupled to the controller of the access terminal is used for storing spot beam identification information including the spot beam links assigned to the access terminal via the satellite communication system. The selection procedure employed by the system and method described facilitate a rapid selection of an appropriate spot beam identified from the multiplicity of radio frequency spot beam links received at a mobile access terminal.

It will be understood that both the foregoing and general description in the following detailed description are exemplary and intended to provide further explanation of the invention as claimed. The accompanying drawings provide an understanding of the invention as described in the preferred embodiments to illustrate the invention and serve to explain the principles of the invention.

BRIEF DESCRIPTION OF THE DRAWINGS

FIG. 4 illustrates the FCCHs and BCCHs for all seven beams in a multiframe;

FIG. 7 illustrates the FCCHs and BCCH positions within a multiframe between two regions;

FIG. 8 illustrates the camp-on and attach times for warm and lukewarm starts;

FIG. 9 illustrates the camp-on time for cold start when $N_{BCCH}=3$; and

DETAILED DESCRIPTION OF THE PREFERRED EMBODIMENTS

Figure 1:
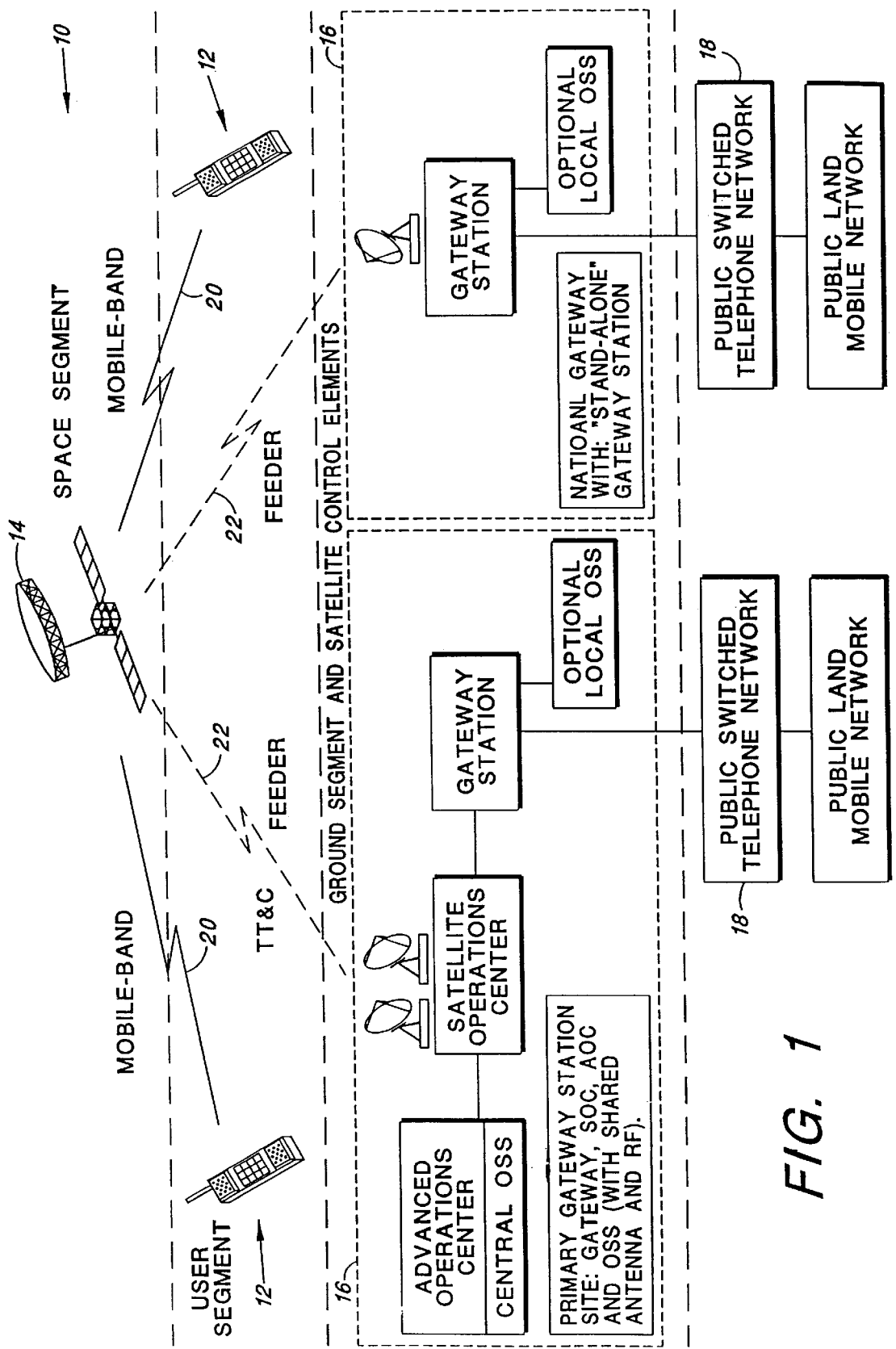
FIG. 1 is a schematic block diagram of a mobile satellite communication system in accordance with, the present invention.

Referring to the drawings and particularly to FIG. 1, a preferred embodiment of a mobile satellite communication system 10 is illustrated. The mobile communication system 10, herein a Geosynchronous Earth Orbit Mobile satellite system (GEM) includes several mobile access terminals 12 and one or more satellites 14. A gateway station 16 (GS) is coupled to the public switch telephone network 18 (PSTN). The access terminal 12 is typically a hand-held telephone or vehicle-mounted telephone, but, as described in the present embodiment, the access terminal 12 may provide operation both as a GEM access terminal and as an GSM cellular telephone. While being used with the satellite communication systems described herein, the access terminal 12 communicates over a mobile link frequency with a particular spot beam 20 with the satellite 14. Additionally, the mobile link may be S-band, L-band, or any band applicable to mobile satellite communication. Each spot beam 20 is associated with a predetermined geographic region. The terrestrial gateway 16 communicates with the satellite 14 over a feeder link frequency. Additionally, the feeder link may be C-band, Ku-band, Ka-band, or any band that can be applicable to mobile satellite allocation.

The satellite 14 includes transponders for translating between the mobile link spot beam 20 signals used by the access terminals 12 and the Ku-band feeder link 22 signals used by the gateway 16. The gateway 16 interfaces with the terrestrial telephony carrier, such as PSTN 18, and may also interface with a conventional cellular network such as GSM. Accordingly, users may place telephone calls using the access terminal 12 to either land line or cellular telephone users.

The satellite 14 provides mobile link-to-mobile link bent pipe single hop communications, as well as satellite switched communications to support communications between the users of the access terminals 12. At satellite 14, the mobile link 20 uplink and downlink are transmitted via multiple mobile link spot beams 20. Subscribers to the system 10 have unique telephone numbers allowing them to receive telephone calls when they are registered to receive pages from either the GEM or the GSM cellular network. Registration is automatic when the access terminal 12 is turned on, such that a registration procedure locates the access terminal 12 within a particular spot beam coverage area. In addition to originating calls, the access terminals 12 can receive calls from any terrestrial facility by connecting the call through the gateway station 16, at which the gateway 16 determines the location of the access terminal 12 and sends a paging message to the access terminal 12 to announce the incoming call.

The system 10 uses a low rate encoded or ciphered voice transmission. In the described embodiments, the access terminals 12 are provided with dual mode operation allowing for voice communications either via satellite or via the local cellular system, e.g., GEM and GSM as discussed herein.

The gateway 16 provides for user mobility as users travel with the access terminal 12 from spot beam to spot beam. Additionally, the communication channels carried via the satellite 14 provides space segment resources used for control functions, i.e., one or more channels in each mobile link spot beam 20 are control channels, e.g., the gateway 16 may place a forward control signal in each mobile link spot beam 20 to allow synchronization of the access terminals 12 and to carry network control information from the gateway 16 to the access terminals 12. The forward control channels allow the access terminals 12 to acquire a satellite carrier and identify the mobile link spot beam 20 and gateway station 16 which originates the signal. The gateway 16 uses the forward control channel to page access terminals 12 using unique addresses to announce mobile terminated calls. Each mobile link spot beam 20 preferably contains a return direction signaling channel that access terminals 12 use to initiate and register calls with the gateway 16. During a call, in-band low data rate control channels are preferably available between the access terminals 12 and the gateway 16 for call supervision, power control, and to initiate call termination.

The system 10 contains considerable operational flexibility both from the standpoint of network features and mobile terminal capabilities. The gateway 16 is a conventional gateway as understood in the art, which includes a mobile switching center (MSC), gateway station controllers (GSCs), gateway transceiver stations (GTS), and radio frequency units. As is understood by those skilled in the art, the MSC allows communications with the public switch telephone network or other mobile switching centers. The MSC is connected preferably with an A-interface such as a standard E1 or E3 line with the GSC. The GSC is then connected through a communications channel such as a T1 line to one or more GTSs which may communicate via radio frequency (RF) communications to the access terminal 12. Telephony communications may be originated with the access terminal 12 by transmitting initialization data to the satellite 14 of the space segment over a control channel which then communicates down to the gateway 16. The control channel is transmitted over a time slot within a frequency assigned to the spot beam 20 having a coverage area surrounding the access terminal 12. At the gateway 16, the call is transmitted via a radio frequency channel to the GTS assigned to the spot beam 20 servicing the access terminal 12. From the GTS the call is routed to the GSC and then to the MSC, from which the call is routed to either the PSTN or another MSC. Thereafter, a communications channel is established through the entire gateway 16 and a subscriber using the access terminal 12 may communicate over the established communications channel. Calls may also originate from either the PSTN or a GSM cellular network by entering the gateway 16 at the MSC which routes information to the GSC for paging the access terminal 12 via the appropriate GTS. After the access terminal 12 responds to the page from the GTS, a communications channel is then established.

Figure 2:
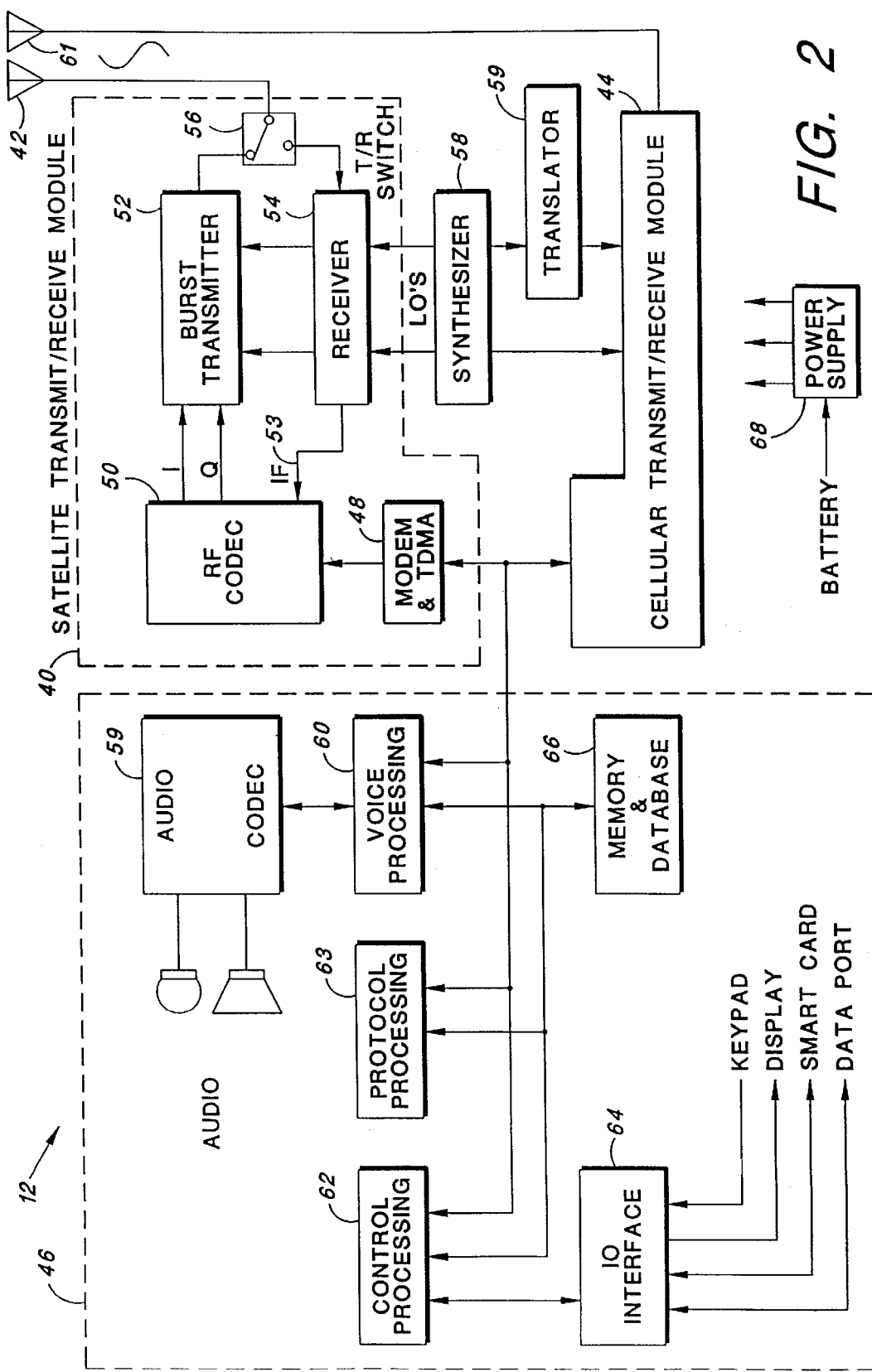
FIG. 2 is a block diagram of a preferred embodiment of a mobile access terminal for use in the mobile satellite communication system of FIG. 1.

The access terminal 12 as shown in FIG. 2 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA unit 48, an RF coder and decoder (codec) 50, a burst transmitter 52, a receiver 54, and a transmit or receive (T/R) switch 56. In the preferred embodiment, the modem 48 is connected to the RF codec 50, and the RF codec 50 is connected to the burst transmitter 52 and to the receiver 54. The T/R switch 56 is connected to the burst transmitter 52, the receiver 54, and the satellite antenna 42.

Within the satellite module 40, the modem 48 converts speech or data samples to and from channel symbols using quadrature phase shift key modulation (QPSK). QPSK is preferably performed digitally by an application-specific integrated circuit or alternatively on a commercial available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 concerts the I and Q signals from the RF codec 50 up to a desired frequency, preferably an mobile link frequency, for transmission by the first antenna 42. The receiver 54 converts a received mobile link signal from the first antenna 42 into the IF signal 53 sent to the RF codec 50.

The T/R switch 56 allows the access terminal 12 to either transmit data or receive data. The access terminal 12 also includes a synthesizer 58 that provides a fixed local oscillator (LO) signal for the RF codec 50. The synthesizer 58 includes a variable local oscillator for channel tuning within the satellite module 40 and generates data clock signals for the modem 48. Both, the fixed local oscillator and the variable local oscillator within the synthesizer 58 may be adjusted based on commands from either the gateway 16 or from another access terminal 12. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements. The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art.

The controller 62 preferably provides a multitasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port for digital communication such as a facsimile transmission, and a smart card interface as specified for GSM.

The cellular module 44 allows the access terminal 12 to communicate with a cellular system over a second antenna 61. The second antenna is a linearly polarized whip meeting cellular system standards and the cellular module 44 uses standard components, such as a GSM chip set, known to those skilled in the art. Preferably, the access terminal 12 operates in a first mode where the access terminal 12 functions as a conventional cellular phone. In a second mode, the access terminal 12 preferably operates so that the access terminal 12 communicates with the satellite 14. A battery 68 is provided for portable operation of the access terminal 12.

The preferred access terminal 12 has many advantages. For example, the access terminal 12 provides dual-mode operation, either cellular or satellite. Also, the access terminal 12 is mobile and provides high quality digital voice. Further, the access terminal 12 allows for paging and messaging, transmission at a 2400, 4800, or 9600 bps data rate via the data port, and provides a convenient cellular-like interface. Also, the access terminal 12 may transmit on a single channel using a single time slot within a carrier signal allowing many other access terminals 12 to transmit over the same carrier. Thus, the access terminal 12 efficiently transmits over mobile link spot beam 20 frequency resources.

The following description relates to the spot beam selection procedure for a user terminal in a GEM satellite system. The camp-on and attach times are also analyzed.

The spot beam selection procedure can be divided into several tasks, as follows:
1. power on;
2. acquire frequency and time synchronization with the satellite;
3. read the system information from the BCCH to determine neighboring BCCH carrier frequencies;
4. measure control frequencies;
5. construct ordered list of control frequencies based on some received signal strength indication (RSSI); and
6. select spot beam from among the candidate BCCH/CCCH carriers within an appropriate public land mobile network (PLMN).

The access terminal (AT) is now considered to be camped on this control carrier within a spot beam. If the RSSI is adequate, the AT is allowed to attempt to access the system. This criteria has not yet been determined. It is assumed, however, that if the AT can read the BCCH, then it can attempt to access the system.

In the procedure which we have developed, these tasks proceed in parallel as much as possible. For example, the BCCH can be read at the same time that it is being measured. Also, as the measurements progress, it may become clear to the AT that some of the control channels in the original list have very little relative power and that others are much stronger. Thus, during the measurement cycle, a neighbor BCCH can be read and its neighbors can replace the weak signals from the original neighbor control channel list.

Spot Beam Selection Procedure

Figure 3:
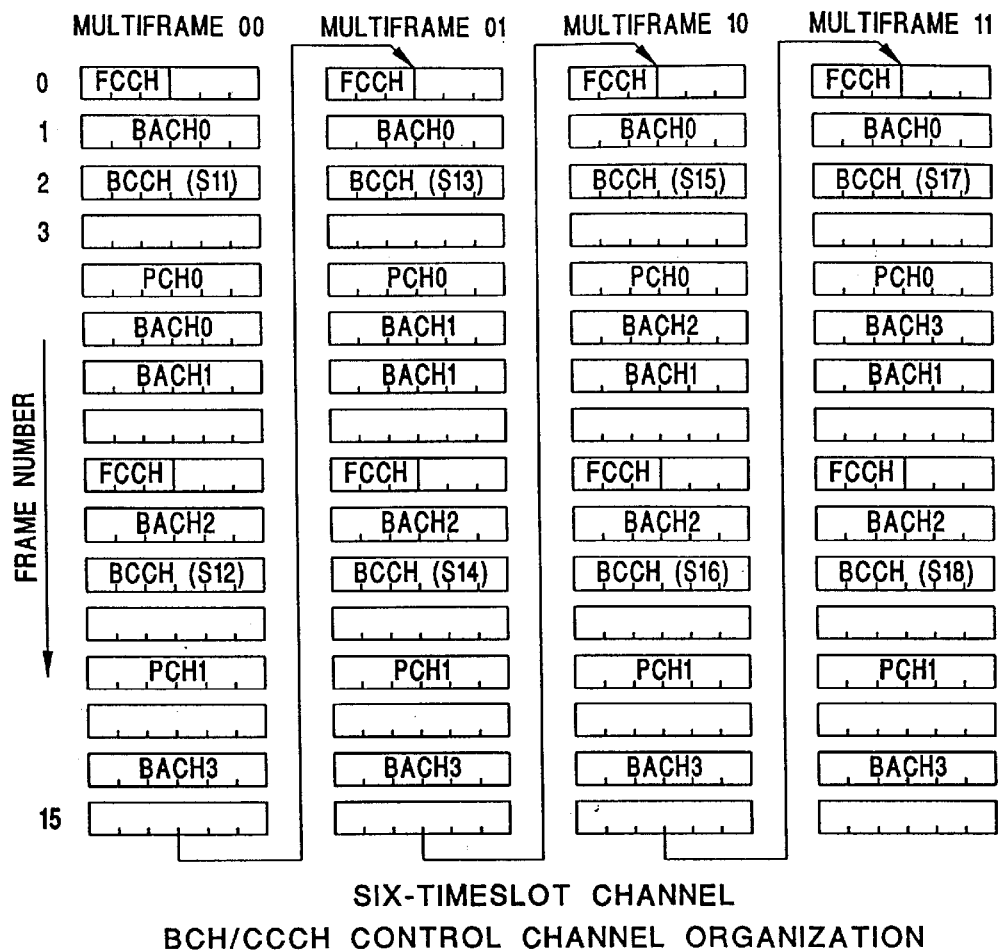
FIG. 3 illustrates the BCCH/CCH control channel organization.

All GSs broadcast their own FCCH and BCCH and control their own system information. However, all broadcast control channels (BCCHs) and common control channels (FCCHs) defining different logical spot beams, but sharing the same physical spot beam, are scheduled at the same time. In addition, each BCCH broadcasts only a neighboring BCCH list containing only six neighbors. Consequently, from the point of view of spot beam selection and reselection, every spot beam has only one BCCH/CCCH control carrier. Of the 24 time slots of this carrier, six time slots are used to transmit broadcast and control channels. The broadcast channels include, among other channels, the FCCH and the BCCH. The FCCH burst is a real chirp signal spanning over three time slots. This three-slot FCCH burst is transmitted in slots 0, 1, 2 on the six-time slot control carrier twice every 16 GEM TDMA frames, i.e., every 320 msec, as shown in FIG. 3. The AT uses the FCCH channel to acquire frequency lock and time synchronization. The BCCH burst is six time slots long or 10 msec. The BCCH is repeated every eight frames or 320 msec, as shown in FIG. 3. The BCCH can always be found in the second frame following the FCCH, as shown in FIG,. 3.

As the AT knows the timing of the BCCH broadcast to within a few microseconds from receipt of the FCCH, it can use the remaining time to scan for BCCHs broadcast in neighbor spot beams. The organization of the BCCH/CCCH control carrier, systemwide planning, and channel assignment, coupled with the fact that every spot beam is symbol-wise synchronous at the satellite, guarantees that the broadcasts of the FCCHs and BCCHs in neighboring spot beams are time orthogonal, as discussed below.

The advanced operation center (AOC) for the GEM system will assign control frequencies to gateways for use in spot beams. In addition, the AOC will specify the six consecutive time slots that the BCCH bursts will use and the frame number within each 16-frame multiframe in which the BCCH is broadcast. The BCCHs and FCCHs from all seven spot beams need to be time orthogonal within a multiframe, such that the AT can measure the BCCHs from all seven spot beams simultaneously and consequently camp on the spot beam as quickly as possible. A list of rules need to be followed to ensure time orthogonality between the seven BCCHs and FCCHs:

1. The AT must be able to see all seven neighbor BCCHs and measure them systematically in time during spot beam selection and reselection. Consequently, the BCCHs and FCCHs from all seven beams should not time overlap.
2. There should always be one time slot gap between any receiving burst on different frequencies to allow the AT synthesizer to retune. The AT synthesizer is required to be tunable across the receive band in 1.6 ms. Consequently, one time slot of 1.67 ms is sufficient to retune the synthesizer.
3. The AT cannot receive (measure or demodulate) more than two bursts in any one frame.
4. The AT has to be able to read GBCH during spot beam selection and reselection in every frame. Consequently, the GBCH should not overlap its own FCCH and any seven BCCHs.
5. The AT must be able to receive PCH during spot beam selection and reselection. Consequently, PCH should not overlap its FCCH and any seven BCCHs.
6. The BACH should not overlap its own FCCH and BCCH.
7. The power should be distributed over all 24 time slots. The design needs to take into account power limited and frequency limited situations.
8. The power should also be ideally distributed in guard times between time slots.

FIG. 4 represents one-time orthogonal position arrangement for FCCHs and BCCHs that meets all these constraints. Because the FCCH and BCCH are transmitted every eight frames, and there is one frame gap between the FCCH and BCCH, there are only eight possible time orthogonal positions in a multiframe for the FCCH and BCCH to be broadcast. These eight positions tessellate the entire satellite coverage area.

Figure 5:
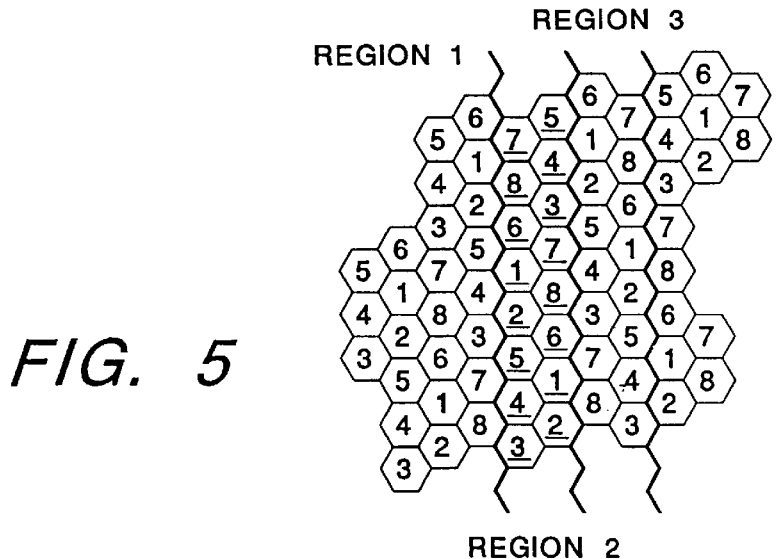
FIG. 5 illustrates the coverage partitioning into regions to spread the satellite power.

To effectively distribute the power over all 24 time slots while distributing the power between time slots in guard times, the satellite coverage is partitioned into regions as shown in FIG. 5.

Figure 6:
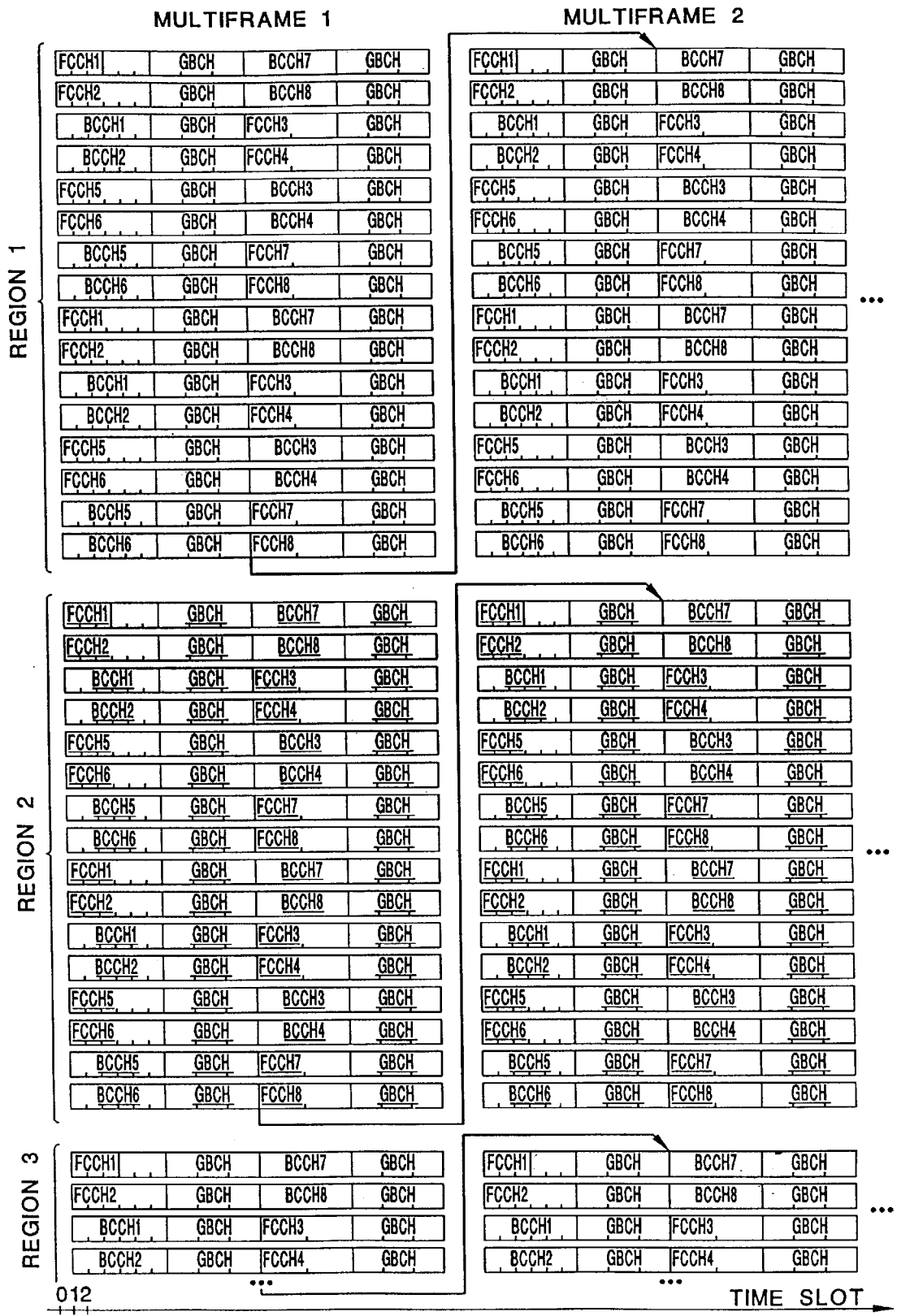
FIG. 6 illustrates that two consecutive regions are delayed by one time slot.
Figure 10:
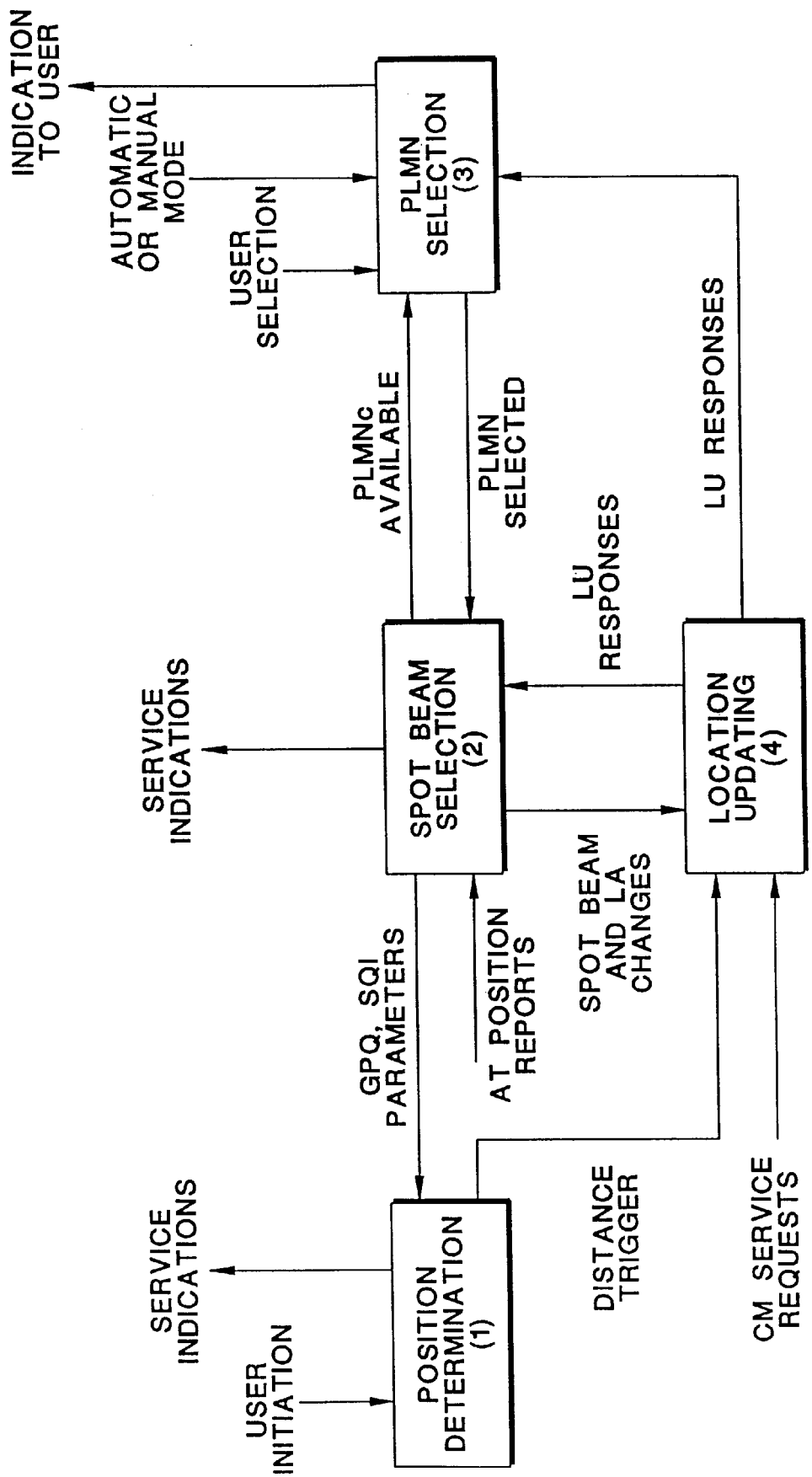
FIG. 10 shows the spot beam selection and reselection procedure of the four (4) processes performed in the idle mode in accordance with the invention.

Each region over the coverage, from left to right, is delayed by one time slot from the next region as shown in FIG. 6.

FIG. 7 shows the BCCHs and FCCHs positions within a multiframe at the border of two of these regions. As shown in FIG. 7, BCCH7 and BCCH8 (similarly FCCH7 and FCCH8) are delayed by one time slot between region 1 and region 2. Because there should always be one time slot gap between any receiving burst on different frequencies to allow the AT synthesizer to retune, each region shall be at least two beams wide. The coverage shall be divided into twelve regions to effectively spread the FCCH and BCCH power in time over the satellite coverage.

BCCH/CCH Measurement Schedule

Once the power-on procedure is complete, the AT will acquire frequency and time synchronization. Three situations can arise, depending on whether or not the following information was stored in the AT when last switched off.

1. BCCH carrier information on which the AT was last camped on before being switched off;
2. BCCH_NEIGHBOR_LIST, which contains the BCCH frequency number (1 to 1087, thus 11 bits); time slot number (any 24 time slot, thus 5 bits), and frame number (any first eight frames, thus 3 bits) for the six neighbor spot beams; or
3. BCCH_CARRIER_LIST, which contains the frequency number (11 bits) of all the BCCH channel numbers used in the system.

If this information was stored in the AT when last switched off, the AT will first scan the FCCH on which it was last camped on and then the BCCH_NEIGHBOR_LIST until it finds a suitable FCCH above a threshold C2. If this search is unsuccessful, the AT will then scan the BCCH_CARRIER_LIST until it finds an FCCH with signal quality above C2. If no FCCH exceeds C2, the AT will select the strongest FCCH in that list, provided that this FCCH exceeds the threshold C1. If no BCCH carrier list information was stored in the AT before it was switched off, the AT has no prior knowledge of the system and will scan all the RF carriers in the LMSS mobile link until it finds one with signal quality above C2. If no FCCH exceeds C2, the AT will select the strongest FCCH in that list, provided that this FCCH exceeds the threshold C1.

Once frequency and time synchronization is acquired, the AT can then begin to simultaneously start reading its own BCCH and measuring the seven time orthogonal BCCHs. All BCCHs of each of the seven beams can be measured sequentially during the measurement period since they are all time orthogonal according to FIG. 4. The spot beam selection procedure can be summarized as follows:

1. Power-on.
2. Acquire frequency and time synchronization with the satellite by finding an FCCH exceeding the minimum initially selectable threshold C2. The AT will first search for a FCCH, starting with the BCCH carrier on which it was last camped on. If unsuccessful, the AT will look at stored lists, starting with the BCCH_NEIGHBOR_LIST and then at the BCCH_CARRIER_LIST. If no FCCH exceeds C2, the AT will select the strongest FCCH in the BCCH_CARRIER_LIST, provided that this FCCH exceeds the threshold C1. The AT remains in this state until it finds a suitable FCCH.
3. Read the system information from the BCCH to determine the six neighboring BCCH carrier frequencies. For warm and lukewarm starts, the AT can read its own BCCH system information (SI) at the same time it starts measuring the seven BCCHs. For cold starts, the AT reads its own BCCH SI prior to measuring the seven BCCHs. A definition of warm, lukewarm, and cold starts is discussed further below.
4. Measure and rank the order of the seven BCCHs based on relative receive-signal strength.
5. After a maximum of 15 measurements, if the strongest spot beam is the same as the one selected while acquiring frequency synchronization, select that spot beam and all the spot beams that are within SB_SELECTION_POWER dB (TBD) of the strongest spot beam. If the strongest spot beam is different from the one selected while acquiring frequency synchronization, go back to step 4: read this BCCH and reschedule the BCCH measurements according to this new list.
6. Acquire the AT position estimate from the seven spot beams' receive-signal strengths.

Spot Beam Selection Algorithm
Physical layer spot beam selection procedure:
i) Once frequency and time synchronization are acquired, read the system information from the BCCH to determine the six neighboring BCCH carrier frequencies.
ii) Scan and measure the neighboring BCCHs based on receive signal strength.
iii) Measure consecutively the BCCH relative power (dB) of beam $1, 2, \ldots, 7$ at measurement iteration j as $p_1^j, p_2^j, \ldots, p_7^j$.
iv) Calculate the mean power, $m_i$ for beam i, in dB for the j measurement cycles as:

$$m_i = \frac{1}{j}\sum_{k=1}^{j} p_i^k$$

v) Calculate the sample variance for the two beams with strongest measured power levels. The indices of these two strongest beams are a and b.

$$V_{ab} = \frac{\sum_{k=1}^{j}[p_a^k - m_a]^2 + \sum_{k=1}^{j}[p_b^k - m_b]^2}{j-1};$$

vi) Repeat measurements (do at least four sets of measurements) until one of the two following conditions is first met:
1. j=15;
2.

$$(m_a - m_b) \geq SB\_MEAS\_VARIANCE * \sqrt{\frac{V_{ab}}{j}};$$

where $m_a$ is the largest mean power, and $m_b$ is the second largest mean power. SB_MEAS_VARIANCE dB (2 dB) is broadcast in the SI.
vii) If the strongest spot beam is the same as the one selected while acquiring the FCCH, select that spot beam and all the spot beams that are within SB_SELECTION_POWER dB (TBD) of the strongest spot beam. The parameter SB_SELECTION_POWER is broadcast in the SI. In parallel, keep the three strongest spot beams mean power for position determination. If the strongest spot beam is different from the one selected while acquiring the FCCH, go back to step i), i.e., read this BCCH and reschedule the BCCH measurements according to this new list.

Spot Beam Reselection Algorithm
Idle mode procedure of the AT at the physical layer:
i) Let spot beam 1 be the beam in which the AT is currently registered. The BCCH RF carrier frequency, starting time slot, and frame number for the six neighboring spot beams are identified in the BCCH system information, of spot beam 1. We let the six neighboring beams be numbered 2, 3, ... 7.
ii) At least every SB_RESELECT_TIMER minutes, measure consecutively the BCCH relative power (dB) of beam $1, 2, \ldots, 7$ at measurement iteration j as $p_1^j, p_2^j, \ldots, p_7^j$.
iii) Calculate the mean power, $m_i$ for beam i, in dB for the j measurement cycles as:

$$m_i = \frac{1}{j}\sum_{k=1}^{j} p_i^k$$

iv) Calculate the sample variance for the two beams with strongest measured power levels. The indices of these two strongest beams are a and b.

$$V_{ab} = \frac{\sum_{k=1}^{j}[p_a^k - m_a]^2 + \sum_{k=1}^{j}[p_b^k - m_b]^2}{j-1};$$

v) Repeat measurements (do at least four sets of measurements) until one of the two following conditions is first met:
1. j=15;
2.

$$(m_a - m_b) \geq SB\_MEAS\_VARIANCE * \sqrt{\frac{V_{ab}}{j}};$$

where $m_a$ is the largest mean power, and $m_b$ is the second largest mean power. SB_MEAS_VARIANCE dB (2 dB) is broadcast in the SI.
Let $m_a$ be the largest mean power and $m_1$ be the mean power of the beam in which the AT is currently registered.
vi) If $m_a = m_1$ or $(m_a - m_1) < SB\_RESELECT\_HYSTERESIS$, then the current beam has either the best beam directivity measure or the other beams are not significantly better enough, i.e., greater than a threshold broadcast in the SI, SB_RESELECT_HYSTERESIS dB (TBD), to warrant a beam switching. The AT remains registered in the same spot beam.
vii) If $(m_a - m_1) \geq SB\_RESELECT\_HYSTERESIS$ for a period of SB_HYSTERESIS_TIMER seconds, then spot beam a is significantly better than the current spot beam. The SB_HYSTERESIS_TIMER is started upon entering vii). If the timer expires, and spot beam a remained better than the current spot beam by SB_RESELECT_HYSTERESIS during the duration of the time countdown, select that spot beam and all the spot beams that are within SB_SELECTION_POWER dB (TBD) of that strongest spot beam. Read the BCCH for each spot beam in this group to identify the PLMN associated with each spot beam.

Camp-On and Attach Times
An access terminal (AT) is camped on a spot beam if it has acquired frequency and time synchronization with the satellite received signal and the received signal strength is adequate to permit the user terminal to access the system. An AT is attached to a spot beam if it is registered in the GEM system within that spot beam and is therefore capable of receiving calls.

Of particular interest is the camp-on time. This is the elapsed time it takes an AT to select the appropriate spot beam and camp on the broadcast control channel/common control channel (BCCH/CCCH) control carrier of that spot beam as measured starting with the AT being powered on. The appropriateness of a spot beam is determined by both the signal strength and the service provider identity of the spot beam.

In the GEM system, sub-satellite spot beams are about 450 km in diameter on the earth's surface. A terminal would have to move more than 450 km from where it was last registered to be outside the cluster of seven beams centered on the beam in which it was last registered. It is thus safe to assume that when an AT is powered on, it is in the same spot beam (or an adjacent beam) where it was last attached most of the time. We have thus optimized the CAI to reduce the camp-on time for ATs which are powered on in either the spot beam in which they were last attached or a neighbor.

We define the case where the AT is powered on in the same spot beam as a warm start. When an AT is powered on in a neighbor spot beam it is a lukewarm start. In both cases, the camp-on time should be less than 15 seconds as a goal, most of the time. Obviously the camp-on time is dependent on the local link propagation conditions, and on user cooperation. Thus, the 15 second goal assumes a reasonably good link.

When an AT is powered on several spot beams removed from where it was powered off, it is considered a cold start. This time should be about the same as an AT which is powered on without a SIM card. Our target time is 30 seconds in this case.

In the GEM system, subsatellite spot beams are at least 450 km in diameter on the earth's surface. A terminal would have to move more than 450 km from where it was last registered to be outside the cluster of seven beams centered on the beam in which it was last registered. It is thus safe to assume that when an AT is powered on, it is in the same spot beam (or an adjacent beam) where it was last attached most of the time. We have thus optimized the GEM system to reduce the camp-on time for ATs that are powered on in either the spot beam in which they were last attached or to a neighbor.

We define the case in which the AT is powered on in the same spot beam as a warm start. When an AT is powered on in a neighboring spot beam, it is a lukewarm start. In both cases, the camp-on time should be less than 15 seconds, as a goal, most of the time. Obviously the camp-on time is dependent on the local link propagation conditions and user cooperation. Thus, this 15-second goal assumes a reasonably good link. Since an AT must function with a valid GSM SIM card and not with a valid GEM SIM card, certain memory of spot beam selection parameters such as the BCCH_NEIGHBOR_LIST are required in the AT. These spot beam selection parameters will be stored in the AT nonvolatile memory when the AT powers off. When an AT is powered onto several spot beams removed from where it was powered off, it is considered a cold start. Our target time is 30 seconds in this case.

Finally, the AT may be powered on when first taken out of the box. We have no specification on this time as it can be made at least as good as a cold start with the insertion of a valid GEM SIM card or after some factory or outlet programming of system information.

The AT always goes through the power-on procedure when it is turned on. It is estimated that the power-on procedure takes 2 seconds. For warm and lukewarm starts, the neighbor list will include the strongest spot beam. Thus, frequency and timing synchronization will be acquired within 320 msec, worst-case, for warm start, and 640 msec, worst-case, for lukewarm start. For warm and lukewarm starts, the AT will read its own BCCH at the same time that it starts measuring and rank ordering the seven BCCHs. After a maximum of 15 measurement cycles, or 4.8 seconds, the AT will have determined the rank-ordered list of control channels and will also have read the BCCHs of the first, second, or third strongest channel in terms of the PLMN identities. Within 100 msec, the MM layer PLMN selection process will be completed, and the best spot beam will be determined, satisfying both the RSSI and PLMN selection criteria. The total estimated camp-on time is, therefore, 7.22 seconds for warm starts. For lukewarm starts, the AT only knows three of its six neighbors when it starts measuring and rank ordering the BCCHs. In the best case, these three neighbors are the three strongest BCCHs in the list. In that case, the estimated camp-on time for lukewarm start is 7.54 seconds, as shown in FIG. 8. However, the three neighbors may not be the three strongest BCCHs. In that case, camp-on time for lukewarm starts would be increased by another 2.56 seconds, corresponding to the worst time required to acquire the BCCH_NEIGHBOR_LIST broadcast in the SI, for a total of 10.1 seconds in the worst case.

Cold Starts

For cold starts, as with warm or lukewarm starts, the AT goes through the power-on procedure, for which 2 second is required. The AT then begins to search for the FCCH. There will be at most $N_{BCCH}$ (TBD:7-217 different frequency carrier) control frequencies allocated by the AOC throughout the entire GEM network. By cold start, it is assumed that the AT has been moved far from the last registered spot beam. The AT will consequently fail to acquire frequency acquisition on the stored FCCH frequencies. The AT will systematically search through its entire list of systemwide control frequencies until it measures significant power. On average it may find a strong signal after having measured six control frequencies, but, in the worst-case, may have to measure up to $N_{BCCH}$. Therefore, this frequency and time synchronization process may take 1.92 seconds on average to $N_{BCCH}$*320 msec (9.6 seconds for $N_{BCCH}$=30). The three-slot FCCH chirp gives both good frequency and time estimates. Unlike the warm start, the AT must read the BCCH to determine the neighboring BCCHs before it can begin the measurement cycles. Of course, as before a maximum of 15 measurement cycles are required to achieve the same probabilities of finding the best spot beam. As with warm starts, within 100 msec, the MM layer PLMN selection process will be completed and the best spot beam will be determined, satisfying both the RSSI and PLMN selection criteria. The total camp-on time is, therefore, 11.38 seconds on average and $(2+(N_{BCCH}/2)*0.64+2.56+2.8+0.1)$ seconds in the worst case (19.06 seconds for $N_{BCCH}$=30), as shown in FIG. 9.

FIG. 9 also shows how GPS acquisition and camp-on can be performed in most parts simultaneously. The AT can read the BCCH SI and the GPS information broadcast in the GBCH simultaneously. To perform the GPS fast acquisition, the AT needs a position estimate to within 100 km which will be provided by the position determination algorithm. The AT will consequently need to wait until the spot beam selection procedure is completed before starting the GPS fast acquisition, as shown in FIG. 9. For cold camp-on time start and the coldest GPS possible, it takes 21.96 to complete the whole process.

Out-of-the-Box Starts

For out-of-the-box starts, as with warm and cold starts, the AT go through the power-on procedure, which takes 2 second if a SIM card is present. The AT then begins to search for the FCCH. In out-of-the-box starts, the AT has no prior knowledge of the frequency allocation of the GEM system. Therefore, the AT must systematically search through all RF channels in the system (i.e., through all 1,087 frequencies in the LMSS band that are used in the GEM system) in the order specified: take measurements of received RF signal strength of each RF channel, and calculate the received level average for each. The averaging is based on at least five measurement samples per RF carrier spread over 1 to 2 seconds, the measurement samples from different RF carriers that are being spread during this period. The center frequency of the carriers in kHz, corresponding to a carrier number, is given by the expressions in the table below:

| Carrier Numbers | | |
|---|---|---|
| | Carrier Center Frequencies (kHz) | Carrier Number |
| Access terminal receive | frequency1 + 31.25 × N | $1 \leq N \leq 1,087$ |
| Access terminal transmit | frequency2 + 31.25 × N | $1 \leq N \leq 1,087$ |

The AT shall first measure RF channel number N=2 and proceed in steps of 5 until N=1082. Then the AT shall measure channel number N=3 and proceed in steps of 5 until N=1083, etc. The RF channels numbered N=607 to N=641 and N=1087 will not be measured. We assume that this situation can be improved by some sort of preprogramming at either the factory or at point-of-sale. On finding a BCCH carrier, the AT will first acquire frequency and time synchronization and then read the BCCH data. The maximum time to read the BCCH data in normal condition, when synchronized to a BCCH carrier, is 2.56 s. The At will then measure and rank in order the BCCHs for a maximum of 15 measurement cycles, or 4.8 s. As with warm and cold starts, the MM layer PLMN selection will then be performed within 0.1 s. The total estimated camp-on time, in the worst case (1,084 frequencies are scanned before frequency and time synchronization are acquired), will equal 356.34 seconds.

It should be appreciated that a wide range of changes and modifications may be made to the preferred embodiments as described herein. Thus, it is intended that the foregoing detailed description be regarded as illustrative rather than limiting and that the following claims, including all equivalents, are intended to define the scope of the invention.

What is claimed is:

1. An access terminal for initiating spot beam selection in a mobile satellite communication system, the access terminal comprising:

a receiver for measuring the received signal strength (RSS) of a multiplicity of radio frequency communication spot beam links, each of said spot beam links including neighboring spot beam information pertaining to a plurality of neighboring spot beam links;

a controller for comparing the signal strengths of each of said spot beam links in view of said neighboring spot beam link information to initiate information communication via a communication channel of the satellite communication system; and a memory coupled to said controller for storing spot beam identification information indicating spot beam links assigned to the access terminal via the satellite communication system.

2. An access terminal as recited in claim 1 wherein said receiver determines the received signal strength from a cell associated with a first spot beam and a cell associated with a second adjacent spot beam.

3. An access terminal as recited in claim 2 wherein said receiver receives broadcast signals from any broadcast channel (BCCH) and six neighboring channels.

4. A system for spot beam selection in a mobile satellite communication system, comprising:

a mobile access terminal;

a radio frequency communication space segment for transmitting communication channels via a multiplicity of spot beam links, each of said spot beam links including neighboring spot beam information pertaining to a plurality of neighboring spot beam links;

a receiver coupled to said access terminal for initiating, based on said neighboring spot beam information, multiple information communication with said space segment via one or more of said multiplicity of spot beam links; and a memory coupled to said receiver for storing spot beam identification information, including said neighboring spot beam information, for establishing the radio frequency communication link to said receiver.

5. A system as recited in claim 4 wherein said mobile access terminal comprises a controller for comparing received signal strength (RSS) of each spot beam to initiate information communication via a communication channel of the satellite communication system.

6. A system as recited in claim 5 wherein said controller simultaneously receives broadcast carrier signals from the multiplicity of radio frequency spot beam links.

7. A method of spot beam selection in a mobile satellite communications system, comprising the steps of:

initiating information communication from the access terminal via a multiplicity of spot beam links to space segment communication channels;

assigning protocol processing information to the access terminal over a radio frequency communication link for conveying multiple communication channels for communication with the access terminal, said protocol processing information including neighboring spot beam information pertaining to a plurality of neighboring spot beams; and controlling said access terminal to select a spot beam link from said multiplicity based on said neighboring spot beam information.

8. A method as recited in claim 7 further comprising the step of receiving carrier signals from each of said multiplicity of spot beam links.

9. A method as recited in claim 8 wherein said receiving step simultaneously receives a broadcast carrier from the multiplicity of spot beam links from the space segment communication channels.

10. A method as recited in claim 8 wherein said receiving step measures the signal strength of the received carrier from the multiplicity of spot beam links from the space segment communication channel on a step by step basis to measure the spot beam signal strength.

11. A method as recited in claim 10 wherein said receiving step sequentially measures individual spot beam link signal strengths from the space segment communication channels.

12. The access terminal of claim 1, wherein each said spot beam is substantially stationary with respect to the earth's surface.

13. The system of claim 4, wherein each said spot beam is substantially stationary with respect to the earth's surface.

14. The method of claim 7, wherein each said spot beam is substantially stationary with respect to the earth's surface.

15. The access terminal of claim 1, wherein said receiver communicates with at least one of a public switched telephone network and another mobile terminal via an air communication interface between a satellite and a gateway.

16. The system of claim 4, wherein said mobile access terminal communicates with at least one of a public switched telephone network and another mobile terminal via an air communication interface between a satellite and a gateway.

17. The method of claim 7, wherein said access terminal communicates with at least one of a public switched telephone network and another mobile terminal via an air communication interface between a satellite and a gateway.

18. An access terminal as recited in claim 1, wherein said neighboring spot beam information includes information indicating a respective frequency and time of broadcast of each of said plurality of neighboring spot beam links.

19. A system as recited in claim 5, wherein said neighboring spot beam information includes information indicating a respective frequency and time of broadcast of each of said plurality of neighboring spot beam links.

20. A method as recited in claim 7, wherein said neighboring spot beam information includes information indicating a respective frequency and time of broadcast of each of said plurality of neighboring spot beam links.

* * * * *